3,591,597
VAPOR PHASE PRODUCTION OF MONOCHLOROCYANOPYRIDINES
William H. Taplin III, Lafayette, and Sven H. Ruetman, Walnut Creek, Calif., assignors to The Dow Chemical Company, Midland, Mich.
No Drawing. Filed Jan. 6, 1969, Ser. No. 789,379
Int. Cl. C07d 31/46
U.S. Cl. 260—294.9                                7 Claims

ABSTRACT OF THE DISCLOSURE

Monochlorocyanopyridines are prepared by the reaction of chlorine and a monocyanopyridine in a process which comprises introducing a monocyanopyridine, usually carried in a substantially inert diluent, both being in the vapor phase, into a reaction zone and contacting this mixture in a rapid turbulent mixing step with at least two moles of chlorine per mole monocyanopyridine. The reaction zone is maintained at a temperature in the range of from about 275° C. to about 375° C.

BACKGROUND OF THE INVENTION

Monocyanopyridines substituted with a single chlorine atom are known compounds and are useful as pesticides and adapted to be employed in the control of plant and insect pests such as two spotted spider mites and others. These compounds are also useful as intermediates in preparing higher chlorinated cyanopyridines which are useful as herbicides, insecticides or the like as taught in U.S. Pats. 3,325,503 and 3,317,549. It is clearly seen that there is a need for a simple, direct method for producing monochlorinated products of monocyanopyridines.

It is an object of the present invention to provide a method for the chlorination of monocyanopyridines to produce monochlorinated monocyanopyridines whereby formation of substantial quantities of degradative by-products may be avoided and whereby tar formation is substantially completely avoided. It is another object of the present invention to provide a method whereby monochlorinated monocyanopyridines may be prepared substantially as a single or major component of a reaction product composition or may be prepared in such amounts as to make recovery of such monochlorinated products practicable as a production method. It is a further object of the present invention to selectively produce a monochlorinated monocyanopyridine product or product composition containing said monochlorinated monocyanopyridine as a readily recoverable major component.

SUMMARY OF THE INVENTION

According to the present invention, it has been discovered that monocyanopyridines may be chlorinated to produce monochlorinated monocyanopyridines substantially free of tarry by-products in a method whereby vapors of an appropriate monocyanopyridine, usually in admixture with a diluent, are rapidly and turbulently mixed with an excess of gaseous chlorine. It has further been discovered that one chlorine atom may be introduced into a monocyanopyridine ring while avoiding the formation of degradative by-products in a method which comprises vaporizing a monocyanopyridine reactant and mixing the resulting vapor mixture with an excess of gaseous chlorine at elevated temperatures.

Representative monocyanopyridines are those wherein the cyano grouping is in the 2-, 3-, or 4-position.

Diluents suitable for carrying out the process of the present invention are materials susbtantially inert to or not detrimentally reactive with the reactants and/or product, particularly the chlorine reactant under the reaction conditions employed. Representative operable diluents include, for example, water, carbon tetrachloride, trichloromethane, dichloromethane and the like with carbon tetrachloride being preferred. Although a diluent of the type set forth hereinbefore is preferred, a diluent does not necessarily have to be employed. In effect, an excess of the chlorine reactant, greater than set forth heerinafter, itself can be used as the reaction medium or carrier.

In carrying out the process of the present invention, mixed vapors of a monocyanopyridine and an appropriate diluent, if employed, are rapidly and turbulently mixed during a brief contact time at temperatures of from about 275° C. to about 375° C. with an excess of gaseous chlorine over the stoichiometric amount required for preparing the monochloromonocyanopyridine product. It is critical and essential for the production of the desired products and avoidance of extensive degradation and tar formation that there be rapid and turbulent mixing of the reactants. It is further essential that the process be carried out in a manner that the heterocyclic compound be contacted with excess chlorine. Generally, there should be provided from about 2 to about 30 or more moles of chlorine per mole of monocyanopyridine in the initial reaction mixture. The preferred ratio is from about 5 to about 30 moles of chlorine per mole of monocyanopyridine. It is among the advantages of the present process that when the reactants and diluents are mixed in the specified manner an exothermic, homogeneous reaction ensues. Thus, the reaction proceeds to good yields of desired products without the need for catalysts.

Preferred conditions for carrying out the reaction include a temperature of about 300° C. to about 350° C.

Although the exact residence time is not critical, the reactants should not be permitted to remain in contact for a prolonged period. The contact period or residence time depends on the temperature within the operable ranges of temperature for particular products. Thus, lowering the temperature ten degrees may double the permissible residence time but will ultimately be limited by the operable range for obtaining a particular product. Residence time generally will not exceed 50 seconds. The preferred time for contact is from about 5 to 20 seconds.

Operating pressures are not critical and may vary from subatmospheric to somewhat superatmospheric. Atmospheric pressure is satisfactory and is preferred.

In carrying out the reaction, ordinarily a monocyanopyridine and diluent are first introduced into an evaporator to produce a vaporized mixture of the heterocyclic nitrogen compound in the diluent. The evaporator is maintained at a temperature at which rapid vaporization occurs, usually in the range of from about 220° C. to about 270° C., preferably from about 10° C. to 50° C. above the boiling point of the monocyanopyridine. Any suitable vaporizing device may be employed as evaporator but a wiped film evaporator has been found to be convenient. For efficient operation, it is necessary that the rate of introduction and/or temperature of the evaporator be maintained so as to completely vaporize the cyanopyridine reactant and maintain the compound in the vaporized state. It has been noted that incomplete vaporization results in decreased yield of the desired monochlorinated cyanopyridine compound. The mixed vapors which are produced are conducted from the evaporator and rapidly and turbulently mixed with the gaseous chlorine. Preferably, the mixing occurs at a point just prior to the point of entry to the reactor, and the resulting gaseous mixture is conducted at a rapid rate in a turbulent flow into the hot reactor where, in the vapor phase, a reaction takes place in the temperature range of from about 275° C. to about 375° C. with the formation of the desired monochlorocyanopyridine. In one preferred embodiment, the mixing of reactants is accomplished in a nozzle which injects the mixture into the reactor. Alternatively, the mixed vapors of monocyanopyridine reactant and diluent and the gaseous chlorine may be simultaneously but separately introduced into the reactor, but in such case, the gaseous chlorine may be jetted in at a point close to the point of introduction of the heterocyclic nitrogen compound in such manner to ensure very rapid mixing and turbulent flow of the reactants. The turbulence must be such as to provide a Reynolds number of at least 800. The preferred Reynolds number is about 2000. Generally, an inlet vapor velocity of about 1400 to 1600 centimeters per second is considered desirable. If desired, the reactor may be insulated to permit reaction to take place under adiabatic conditions, but this is not essential in the practice of the instant process. The vapors passing from the reactor are cooled or quenched to separate (a) a liquid mixture comprising monochlorinated cyanopyridine hydrochloride salt products, diluent and unreacted monocyanopyridine hydrochloride from (b) a gaseous mixture comprising chlorine and hydrogen chloride by-product. The liquid mixture is base neutralized and may be fractionally distilled to recover the desired products in substantially pure form or may be cooled to precipitate the product which is then recovered by filtration and the filtrate recycled to the evaporator preheater for further reaction. The gas mixture may be scrubbed according to conventional procedures to separate chlorine from hydrogen chloride. The former may be dried and recycled while the latter may be recovered, for example, as aqueous hydrochloric acid. The monochloromonocyanopyridine product whether recovered by distillation, precipitation or by filtration may be further purified, if desired, by methods well-known to the skilled in the art.

Any suitable reactor may be employed, however, the reactor preferably is designed to prevent or minimize back-mixing of the chlorinated product with the unchlorinated monocyanopyridine. Since the reaction is not strongly exothermic, heating is generally required, particularly at the initiation of the reaction. Thereafter heat input is only necessary to compensate for heat loss to the environment. The inlets, outlets and interior surfaces of the reactor should be of materials such as are known to resist corrosion by chlorine and hydrogen chloride at high temperatures. Thus, for example, such surfaces may be lined with nickel, carbon, silica or glass. In practice, it has been found that thermally resistant, high-silica glass such as Vycor brand is satisfactory for small reactors. In large scale apparatus, it is convenient to employ a shell of nickel lined with fused silica or a suitable refractory such as carbon. To accomplish the essential rapid, turbulent mixing and introduction of the reactants into the reaction zone, the reactor may be fitted with a mixing nozzle, as described above, for introducing the reactants with substantially simultaneous mixing. Alternatively, the organic reactant plus diluent and the chlorine may be introduced into the reactor by separate but closely adjacent orifices adjusted so that the chlorine is jetted into the incoming stream of organic reactant plus diluent. In a further embodiment wherein the monocyanopyridine, diluent and chlorine are introduced into the reactor with mixing immediately prior to such introduction, the mixing and introduction are carried out in a tube or the like of a diacreter which is small in relation to the diameter of the reactor whereby turbulence at the entrance is achieved at relatively low Reynolds numbers in accordance with known principles. In a preferred form of apparatus, the reactor proper is in the form of a cylinder having a length of 5 times the diameter. Conventional accessories, such as flowmeters on the inputs and condensors, cooling tubes or a quench tower for the exit gases, are employed.

In a preferred method for carrying out the process according to the present invention, a mixture of a monocyanopyridine reactant and chlorohydrocarbon diluent is introduced into a wiped film evaporator where the reactant and diluent are vaporized, the vapors are rapidly mixed with gaseous chlorine within the reactant ratio set forth hereinbefore and introduced into a heated reactor at high turbulence and reacted within a temperature range of from about 275° C. to about 375° C. thereby to produce the desired monochlorocyanopyridines. The mixture of desired product and any unreacted starting materials or by-products, such as hydrogen chloride, is conducted from the reactor, condensed to separate the product from volatile by-products and the product recovered from the liquid condensate by conventional procedures.

DESCRIPTION OF THE PREFERRED EMBODIMENTS

The following examples illustrate the invention but are not to be construed as limiting:

Example 1

A cylinder of Vycor high-silica glass of 3.5 inch diameter and about 18 inches in length was tapered to inlet and outlet tubes and fitted with electrical heating coils and efficient insulation to serve as a reactor having a capacity of about 1.35 liters. The outlet was connected to a coolable collection vessel and the latter was vented through a reflux condenser to an acid-gas recovery system. The inlet tube ended in a nozzle projecting about 1 inch into the reactor and having an opening into the reactor 0.25 centimeter in diameter. Inside the nozzle was a smaller concentric tube for chlorine introduction ending 0.5 inch before said nozzle opening. The upstream end of the inlet tube connected to an electrically heated vaporizer-preheater tube for introduction of a cyanopyridine reactant and diluent.

A solution consisting of 5 percent by weight of 4-cyanopyridine and 95 percent by weight of carbon tetrachloride is metered into the vaporizer-preheater at a rate of about 7.68 grams per minute while the vaporizer is heated so that the resulting vapor mixture passes to the inlet nozzle at a temperature of about 270° C. In the nozzle the 4-cyanopyridine and diluent vapor are rapidly mixed with chlorine as the reactant mixture is forced through the nozzle into the reactor at a velocity of about 1485 centimeters per second. The chlorine is introduced at a rate of 3.35 grams per minute to provide 13 moles of chlorine per mole of 4-cyanopyridine in the reaction mixture. The reaction is carried out at a reactor temperature of 275° C. with a residence time in the reactor of about 13 seconds and a total run time of 38 minutes. The hot effluent gases from the reactor are trapped in two consecutive Dry Ice traps. The excess chlorine, hydrogen chloride by-product and diluent are removed from the effluent by evaporating on a steam bath. The crude product is dissolved in water and neutralized with dilute aqueous sodium hydroxide and extracted with methylene dichloride. The separated methylene dichloride solution is dried over magnesium sulfate and contacted with activated charcoal. The methylene dichloride is removed by evaporating on a steam bath leaving 28 grams of a product which is found by gas-liquid chromatography (G.L.C.) to be a mixture of about 7 mole percent of 2-chloro-4-cyanopyridine and about 2 mole percent of unidentified volatile products, balance unreacted 4-cyanopyridine starting material. No polychlorinated monocyanopyridines are found.

Example 2

Using the apparatus and general procedure as described in Example 1, a solution of 5.0 percent by weight of 4-cyanopyridine in carbon tetrachloride is passed through the vaporizer at a temperature range of from 220° to 270° C. The resulting vapor mixture is mixed in the nozzle with 14 moles of chlorine per mole of 4-cyanopyridine and passed into the reactor at a nozzle velocity of about 1440 centimeters per second. The reaction is carried out at a reactor temperature of 300° C. with a residence time of 19 seconds and a total run time of 60 minutes to produce a base neutralized crude product in a yield of 11.2 grams containing about 39 mole percent of 2-chloro-4-cyanopyridine as the sole chlorinated product, about 61 mole percent of unreacted monocyanopyridine starting material and no polychlorinated compounds as determined by G.L.C. analysis. The feed rate for this reaction is 6.36 grams per minute and the chlorine rate is 3.35 grams per minute.

Example 3

The apparatus and general procedure of Example 1 is employed with the following variables:

Cyanopyridine feed: solution of 5 percent by weight of 4-cyanopyridine in carbon tetrachloride.
Feed rate: 6.53 grams per minute.
Vaporizer temperature: about 270° C.
Molar ratio of chlorine/4-cyanopyridine: about 15.
Chlorine feed rate: 3.35 grams per minute.
Nozzle velocity: 1520 centimeters per second.
Reactor temperature: 325° C.
Residence time: about 17 seconds.
Total run time: 60 minutes.

31 grams of a crude product containing 2-chloro-4-cyanopyridine as the major component (66 mole percent) is obtained and upon purification by recrystallizing twice from a hexane/trichloromethane mixture (~3/1) to recover a purified 2-chloro-4-cyanopyridine product. This compound melts at 67°–68° C. (Chem. Abs. 56, 3445d, 1962 reports a melting point of 67–68° C.) Its structure is confirmed by Nuclear Magnetic Resonance Spectroscopy (N.M.R.) and by comparative infrared spectroscopy (I.R.) with a standard sample. The product is found by analysis to have carbon, hydrogen, nitrogen and chlorine contents of 51.9, 2.2, 20.4 and 25.5 percent, respectively, as compared with the theoretical contents of 52.0, 2.2, 20.2 and 25.6 percent, respectively, calculated for the named structure.

Example 4

The apparatus and general procedure of Example 1 is employed with the following variables:

Cyanopyridine feed: solution of 10 percent by weight of 2-cyanopyridine in carbon tetrachloride.
Feed rate: 5.93 grams per minute.
Vaporization temperature: ~270° C.
Molar ratio of chlorine/2-cyanopyridine: about 8.
Chlorine feed rate: 3.35 grams per minute.
Nozzle velocity: 1400 centimeters per second.
Reactor temperature: 300° C.
Residence time: about 20 seconds.
Total run time: 90 minutes.

39 grams of a crude product is obtained which upon G.L.C. analysis is shown to contain no polychlorinated compounds and to contain 3 mole percent 6-chloro-2-cyanopyridine as the sole chlorinated product in admixture with unreacted 2-cyanopyridine.

Example 5

The apparatus and general procedure of Example 1 is employed with the following variables:

Cyanopyridine feed: solution of 10 percent by weight of 2-cyanopyridine in carbon tetrachloride.
Feed rate: 5.96 grams per minute.
Vaporization temperature: about 270° C.
Molar ratio of chlorine/2-cyanopyridine: about 8.
Chlorine feed rate: 3.35 grams per minute.
Nozzle velocity: 1530 centimeters per second.
Residence time: about 18 seconds.
Reactor temperature: 350° C.
Total run time: 52 minutes.

44 grams of a crude product is obtained, which upon G.L.C. analysis is found to contain no polychlorinated compounds and to contain 6-chloro-2-cyanopyridine as essentially the only chlorinated product in 66 percent yield along with unreacted starting material.

Example 6

The apparatus and general procedure of Example 1 is employed with the following variables:

Cyanopyridine feed: solution of 10 percent by weight of 3-cyanopyridine in carbon tetrachloride.
Feed rate: 6.61 grams per minute.
Vaporization temperature: about 270° C.
Molar ratio of chlorine/3-cyanopyridine: about 7.
Chlorine feed rate: 3.35 grams per minute.
Nozzle velocity: 1470 centimeters per second.
Residence time: about 19 seconds.
Reactor temperature: 300° C.
Total run time: 60 minutes.

27 grams of a crude product is obtained, which upon G.L.C. analysis is found to contain 37 mole percent 6-chloro-3-cyanopyridine, 2 mole percent of the 2-chloro isomer and about 61 mole percent unreacted 3-cyanopyridine.

Example 7

In runs carried out in a fashion similar to Example 6, using reactor temperatures of 325° and 350° C., respectively, and nozzle velocities of 1540 and 1600 centimeters per second, respectively, and residence times of ~18 and ~17 seconds, respectively, good conversions to 6-chloro-3-cyanopyridine are obtained.

Example 8

In a run carried out in a manner similar to that described in Example 6, good conversion to 6-chloro-3-cyanopyridine is obtained when water is used as the solvent.

Example 9

In a run carried out in a manner similar to that described in Example 6, good conversion to 6-chloro-3-cyanopyridine is obtained when no solvent is employed and the molar ratio of chlorine is about 20 moles per mole of 3-cyanopyridine.

Although somewhat reduced yields apparently are shown by some of the above examples, it should be noted that the reaction is selective with respect to the preparation of a monochlorinated product and no polychlorinated compounds are produced. The product conversion therefor is very good with respect to negligible impurity production and the desired monochloromonocyanopyridine product is readily recovered. Further, unreacted starting material may be recycled or reused in subsequent passes, thereby adding to the overall conversion as is readily understood by one skilled in the art.

The monocyanopyridines employed as starting materials are commercially available or can be prepared by the ammoxidation method described in Chemical Engineering Progress, September 1964, pages 48–49.

What is claimed is:

1. A process for the production of a monochlorocyanopyridine which consists of rapidly mixing in a turbulent flow, chlorine and a vaporized monocyanopyridine from the group consisting of 2-cyanopyridine, 3-cyanopyridine and 4-cyanopyridine, at a temperature within the range of from about 275° to about 375° C., and wherein the chlorine and monocyanopyridine reactants are present in a molar ratio of from about 5 to about 30 moles of chlorine per mole of monocyanopyridine, and including the step of recovering the resulting monochlorocyanopyridine product.

2. The process of claim 1 wherein the monocyanopyridine is carried in a chlorinated hydrocarbon diluent and the reaction temperature ranges from about 300° to about 350° C.

3. The process of claim 1 wherein the chlorinated hydrocarbon is carbon tetrachloride.

4. The process of claim 1 and including the steps of cooling the product thereby to condense said monochloromonocyanopyridine and separate said monocyanopyridine from gaseous by-products.

5. The process of claim 1 wherein when 2-cyanopyridine is the monocyanopyridine employed, the product is 6-chloro-2-cyanopyridine.

6. The process of claim 1 wherein when 3-cyanopyridine is the monocyanopyridine employed, the product is 6-chloro-3-cyanopyridine.

7. The process of claim 1 wherein when 4-cyanopyridine is the monocyanopyridine employed, the product is 2-chloro-4-cyanopyridine.

References Cited
UNITED STATES PATENTS

| | | | |
|---|---|---|---|
| 3,325,503 | 6/1967 | Bimber | 260—294.9 |
| 3,317,549 | 5/1967 | Johnston | 260—294.9 |
| 3,420,833 | 1/1969 | Taplin | 260—283 |

ALAN L. ROTMAN, Primary Examiner

U.S. Cl. X.R.

71—94